US010512048B2

(12) United States Patent
Isaacs et al.

(10) Patent No.: US 10,512,048 B2
(45) Date of Patent: Dec. 17, 2019

(54) SYSTEM AND METHOD FOR RADIO CELL SYNCHRONIZATION (71) Applicant: Ceva D.S.P. Ltd., Herzlia Pituach (IL)

(72) Inventors: Omri Isaacs, Herzliya (IL); Zeev Kaplan, Karmiel (IL); Tal Shalev, Kfar Shmuel (IL)

(73) Assignee: Ceva D.S.P Ltd., Herzlia Pituach (IL)

( * ) Notice: Subject to any disclaimer, the term of this patent is extended or adjusted under 35 U.S.C. 154(b) by 53 days.

(21) Appl. No.: 15/657,586

(22) Filed: Jul. 24, 2017

(65) Prior Publication Data
US 2019/0028982 A1 Jan. 24, 2019

(51) Int. Cl.
H04W 56/00 (2009.01)
H04L 5/00 (2006.01)
(Continued)

(52) U.S. Cl.
CPC ......... *H04W 56/001* (2013.01); *H04L 5/0007* (2013.01); *H04L 7/007* (2013.01);
(Continued)

(58) Field of Classification Search
None
See application file for complete search history.

(56) References Cited

U.S. PATENT DOCUMENTS 7,826,567 B2   11/2010 Gruijters et al.
8,917,704 B2 * 12/2014 Swarts ............... H04L 27/2668
                                                    370/336
(Continued)

FOREIGN PATENT DOCUMENTS

CN   103532901   1/2014
CN   103825859   5/2014
(Continued)

OTHER PUBLICATIONS

"NB-PSS and NB-SSS Design" 3GPP TSG RAN WG1 Meeting #84 Feb. 15-19, 2016; pp. 1-20 St. Julian's, Malta Qualcomm Incorporated.
(Continued)

*Primary Examiner* — Ayaz R Sheikh
*Assistant Examiner* — Tarell A Hampton
(74) *Attorney, Agent, or Firm* — Pearl Cohen Zedek Latzer Baratz LLP (57) ABSTRACT A system and method for cell synchronization suitable for a wireless signal including substantially identical synchronization signals that repeat in predetermined time intervals, the synchronization signals including a plurality of substantially identical symbols. For a plurality of candidate synchronization points: dividing the wireless signal into a plurality of signal segments, each equal or longer than the time interval, and each including a plurality of sub-segments having substantially same length as the symbol; performing symbol-length cross-correlations between an expected symbol and the sub-segments; performing segmented symbol-wise correlations between the cross-correlation results; calculating a cost function based on the results of the symbol-wise correlations; accumulating the cost functions across a plurality of signal segments; and selecting a coarse synchronization point from the plurality of candidate synchronization points based on the accumulated cost function; Estimating synchronization parameters e.g. time and frequency offset based on the selected synchronization point.

20 Claims, 7 Drawing Sheets (51) Int. Cl.
  *H04L 7/00* (2006.01)
  *H04W 88/02* (2009.01)
  *H04W 88/08* (2009.01)

(52) U.S. Cl.
  CPC ........ *H04W 56/0055* (2013.01); *H04W 88/02* (2013.01); *H04W 88/08* (2013.01)

(56) References Cited

U.S. PATENT DOCUMENTS

| | | | |
|---|---|---|---|
| 9,065,630 | B1 | 6/2015 | Xiao et al. |
| 2011/0188465 | A1 | 8/2011 | Han et al. |
| 2013/0201869 | A1* | 8/2013 | Wilden ............... H04W 56/002 370/254 |
| 2016/0087744 | A1* | 3/2016 | El Ayach ............. H04J 11/0086 370/328 |
| 2016/0218821 | A1* | 7/2016 | Adhikary ............. H04J 11/0069 |
| 2016/0262123 | A1 | 9/2016 | Abedini et al. |
| 2016/0270015 | A1* | 9/2016 | Lin .................. H04W 56/0025 |
| 2016/0309398 | A1* | 10/2016 | Xue .................. H04W 52/0206 |
| 2016/0337998 | A1 | 11/2016 | Kim |
| 2016/0374035 | A1 | 12/2016 | Wang et al. |
| 2017/0034798 | A1* | 2/2017 | Lin ......................... H04L 5/001 |
| 2017/0135052 | A1 | 5/2017 | Lei et al. |
| 2017/0264406 | A1* | 9/2017 | Lei ...................... H04J 11/0069 |
| 2018/0041978 | A1* | 2/2018 | Chang ................. H04W 56/004 |
| 2018/0145819 | A1* | 5/2018 | Axmon ..................... H04L 5/16 |
| 2018/0184390 | A1* | 6/2018 | Wu ..................... H04L 27/2613 |
| 2018/0316539 | A1* | 11/2018 | Han ..................... H04L 5/0048 |

FOREIGN PATENT DOCUMENTS

| | | |
|---|---|---|
| EP | 3 057 252 | 8/2016 |
| WO | WO 2015/054950 | 4/2015 |
| WO | WO-2018130311 A1 * | 7/2018 .......... H04J 11/0073 |

OTHER PUBLICATIONS

Harald Kröll et al. "Maximum-Likelihood Detection for Energy-Efficient Timing Acquisition in NB-IoT" Integrated Systems Laboratory, ETH Zurich, Switzerland Nov. 23, 2016.

Hongjian Gao et al. "A Robust Synchronization for 230 MHz Electricity System in the Presence of Narrowband Interference" Jul. 26-27, 2014 pp. 114-119 China Electric Power Research Institute (CEPRI), Beijing, China 2014 Symposium on Computer Applications and Communications.

Lee et al. "The Application of Correlation Functions in the Detection of Small Signals in Noise" Research Laboratory of Electronics Massachusetts Institute of Technology Mar. 7-10, 1949.

European Search Report of Application No. EP 18 18 2162 dated Nov. 15, 2018.

* cited by examiner

SYSTEM AND METHOD FOR RADIO CELL SYNCHRONIZATION

FIELD OF THE INVENTION

The present invention relates generally to the field of radio communication cell synchronization, for example to cell synchronization in narrowband Internet of things (NB-IoT) radio technology standard.

BACKGROUND

Narrow-band internet-of-things (NB-IoT) is a Low Power Wide Area connectivity standard defined initially in 3GPP Release for the IoT market. NB-IoT is intended to be used for ultra-low cost user equipment (UE) devices, which are often equipped with low-cost oscillators. Such low cost oscillators may cause an initial carrier frequency offset (CFO) due to limited stability of up to 20 parts per million (ppm). IoT UE is expected to be dormant most of the time. When powered on, the UE needs to correct for these frequency offsets. Thus, the UEs need to perform time and frequency synchronization with the base station (eNodeB) in order to transmit and receive data. Synchronization may include aligning with the frequency of the base station, e.g., tuning the frequency of the UE to the frequency of the carrier signal, and aligning with the timing of the frame structure. Cell synchronization in NB-IoT is performed by the UE based on primary and secondary synchronization signals that the base station broadcasts, e.g., narrow-band primary synchronization signal (NPSS) and narrow-band secondary synchronization signal (NSSS), respectively. NB-IoT supports enhanced coverage, with the requirement to detect radio communication cells in a very low signal to noise ratio (SNR) conditions of, e.g., −12.6 dB and lower, due to difficult outdoor conditions.

Release 13 of the LTE standard defines a new UE category, NB1, in which the legacy synchronization channels, PSS and SSS, were modified to support NB-IoT with reduced bandwidth. Transmission according to the LTE standard is divided into radio frames of 10 msec. According to the LTE standard, the eNodeB repeatedly transmits a known NPSS and NSSS in constant time intervals, e.g., every 10 msec (e.g. radio frame), which the UE synchronizes with before it can receive information from the eNodeB.

Synchronization algorithms have been greatly investigated in communication and GPS systems. Known synchronization algorithms, for example, synchronization algorithms commonly used in GPS systems, are based on cross-correlation method, referred to herein as full-length cross-correlation. Full-length cross-correlation methods relay on knowledge of the synchronization signal at the receiver side. Applicable to NB-IoT systems, full-length cross-correlation methods may be implemented by correlation of the received signal at time $\tau$ denoted by $x[\tau]$ with the NPSS, e.g.:

$$\rho(\tau)=\Sigma_{n=0}^{N_{NPSS}-1} x[n+\tau] NPSS^*[n]\exp(j2\pi f_h n) \quad \text{(Equation 1)}$$

Where NPSS* is the conjugate of the NPSS sequence (throughout the application, an asterisk,*, may indicate a conjugate value), $N_{NPSS}$ is the length of the NPSS sequence, $\tau$ is a candidate synchronization point in the radio frame (e.g., a point in time or a sample number within the radio frame), and $f_h$ is a hypothesis of the of the receiver's initial CFO. It is noted that the length of the full-length cross-correlation substantially equals a length of a full NPSS sequence.

Other synchronization methods, which are mentioned as suitable for NB-IoT communication systems, are based on symbol-wise auto-correlation. The symbol-wise auto-correlation relies on the repetitive structure of the NPSS sequence. NPSS sequence includes repetitions of NPSS orthogonal frequency-division multiplexing (OFDM) symbols multiplied by a known code cover. Thus, symbol-wise auto-correlation may be performed between the NPSS symbols of the NPSS sequence. Symbol-wise auto-correlation procedure may be performed based on, for example, the following equations:

$$S_k(\tau)=\Sigma_{n=0}^{N_{symbol}-1} x(\tau+n)x^*(\tau+n-kN_{symbol}) \quad \text{(Equation 2)}$$

$$\rho(\tau)=w_1 S_1(\tau)+w_2 S_1^*(\tau)S_2(\tau)+w_3 S_2^*(\tau)S_3(\tau) \quad \text{(Equation 3)}$$

Where $S_k(\tau)$ is the symbol-wise auto-correlation results, $\rho(\tau)$ is a cost function and $w_1$, $w_2$, $w_3$ are weights.

In some scenarios UE's battery life should last over 10 years. One major contributor to the UE power consumption is the radio frequency (RF) transceiver. In order to meet the strict power requirements UE "RF-ON" duration should be minimized as possible. Reduced synchronization time results in shorter "RF-ON" period and therefore lowers the power consumption of the UE considerably.

SUMMARY OF THE INVENTION

According to embodiments of the present invention, there is provided a method and system for radio cell synchronization suitable for a wireless (e.g., radio) signal including a plurality of synchronization signals substantially identical to each other that repeat in predetermined time intervals, the synchronization signals including a plurality of substantially identical synchronization symbols. For a plurality of coarse candidate synchronization points embodiment of the invention may include: dividing the wireless signal into a plurality of signal segments, each equal or longer than the time interval in duration, and each including a plurality of sub-segments having same time duration (e.g., length) as a symbol of the plurality of synchronization symbols; calculating symbol-length cross-correlations between an expected symbol and the sub-segments; calculating segmented symbol-wise correlations between the symbol-length cross-correlation results; calculating a cost function based on the results of the symbol-wise correlations; accumulating the cost functions across a plurality of signal segments; and selecting or determining a coarse synchronization point from the plurality of candidate synchronization points based on the accumulated cost function. According to embodiments of the present invention, the symbol-length cross-correlation may be calculated recursively, and the segmented symbol-wise correlations may be calculated recursively, and the product of the cover code may calculated in advance based on knowledge of the cover code.

According to embodiments of the present invention, accumulating the cost functions may continue until a predetermined condition is met, and determining the coarse synchronization point of the wireless signal may include finding the accumulated cost function with a highest peak in its absolute value and selecting the coarse synchronization point based on a location of the highest peak.

According to embodiments of the present invention, calculating symbol-length cross-correlations, calculating auto-correlations, calculating a cost function and accumulating the cost functions may repeat for a plurality of frequency hypotheses.

According to embodiments of the present invention, estimating a coarse frequency of the wireless signal may be performed based on a frequency hypothesis with the highest peak in its absolute value and on the phase of a value of the highest peak of the accumulated cost function.

Embodiments of the present invention may include performing estimation of a fine synchronization point and a fine carrier frequency using the coarse synchronization point and the coarse carrier frequency; and communication between the UE and the base station may be established using the estimated fine carrier frequency and fine synchronization point.

Embodiments of the present invention may include decimation of the wireless signal prior to dividing the wireless signal to the plurality of signal segments. According to embodiments of the present invention, decimation of the wireless signal prior to dividing the wireless signal to the plurality of signal segments may be performed using a varying decimation step.

Embodiments of the present invention may include, for a plurality of fine candidate synchronization points: calculating symbol-length cross-correlations between an expected sequence and segments of the wireless signal; accumulating the symbol-length cross-correlation values across a plurality of signal segments until a predetermined condition is met; finding a highest accumulated symbol-length cross-correlation; and determining a fine synchronization point of the wireless signal based on the highest accumulated symbol-length cross-correlation.

Embodiments of the present invention may include calculating the symbol-length cross-correlations at a high sampling rate.

According to embodiments of the present invention, the accumulation of the cost function may be weighted using a decay factor.

According to embodiments of the present invention, the synchronization signal may be a NPSS, and wherein the symbols are NPSS symbols with an OFDM symbol length.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices, or VLSI logic circuits.

Embodiments of the present invention provide a method for cell synchronization. Synchronization may include aligning with the frequency of the base station, e.g., tuning the frequency of the UE to the carrier frequency of the base station, and aligning with the timing of the structure of the radio frame. Aligning with the frequency of the base station may include estimating the CFO or the carrier frequency of the wireless signal. Aligning with the timing of the structure of the radio frame may include finding a known timing point in the radio frame. A synchronization signal, e.g., NPSS and NSSS, may be at a known location within a frame of the wireless signal. Therefore, aligning with the timing of the structure of the radio frame may include finding the location of the synchronization signal, (e.g., the timing location of the synchronization signal within the radio frame). Thus, aligning with the timing of the structure of the radio frame may include finding the time offset in a radio frame, in which the NPSS is transmitted. The time and frequency synchronization procedure typically includes a coarse synchronization stage and a fine synchronization stage. The coarse synchronization stage is performed using the received signal, typically after the received signal is decimated (e.g., downsampled). Throughout the application, the terms received signal and wireless signal may refer to the same signal and may be used interchangeably. When the coarse synchronization stage is performed, the receiver has no initial knowledge of the timing and frequency offset of the received signal. The fine synchronization stage is typically performed after the coarse synchronization stage, typically using the received signal at a high sampling rate (e.g., the received signal, prior to decimation). At the fine synchronization stage the time and frequency estimations from the coarse synchronization stage may be used as an initial estimate of the timing and frequency of the received signal, e.g., search may be performed around that initial estimation. After the fine synchronization stage, the UE may have an estimation of the timing and frequency of the received signal, which may be used by the UE for detecting the cell ID and a radio frame index from the NSSS. A base station may transmit or broadcast a known NPSS and NSSS in constant time intervals. NPSS and NSSS timing and sequence may be known to UEs. Thus, UEs may expect NPSS and NSSS sequences.

According to embodiments of the present invention, cell synchronization may be achieved using symbol-length cross-correlations followed by segmented symbol-wise auto-correlation of the symbol-length cross-correlation results. This two-phase synchronization provides significant advantages over known synchronization methods, specifically over full-length cross-correlation and symbol-wise auto-correlation methods. While full-length cross-correlation may provide low synchronization time, it may require large memory allocation and its computational complexity is extremely high making the algorithm infeasible in an IoT system. Additionally, the initial estimation of the carrier frequency needs to be quite accurate for the full-length cross-correlation to work. In the scenario of NB-IoT, where the initial CFO has high range of possible values, this may result in unacceptable performance in the case when the difference between the CFO of the frequency hypotheses and the true CFO is too high. One way to overcome this would be to test a large amount of frequency hypotheses. For example, in order to obtain reasonable accuracy (e.g., probability of detection), with CFO in range of up to ±20 ppm plus 7.5 KHz, as much as 44 frequency hypotheses need to be tested. However, testing a large amount of frequency hypotheses increases the computational complexity and the size of the memory allocations. The computational complexity of symbol-wise auto-correlation may be very low. However, symbol-wise auto-correlation is very sensitive to noise. When the SNR is low, as is expected for IoT UEs in enhanced coverage conditions, this results in very long synchronization times. Embodiments of the present invention may allow considerable shortening of the synchronization time compared to other methods, thus reducing the power consumption of UE, while keeping the computational complexity low and the accuracy or probability of detection high.

Embodiments of the present invention may be suitable for initial cell synchronization, where both the carrier frequency and frame timing may be unknown. Embodiments of the present invention may support initial cell synchronization for SNR lower than −12.6 dB, CFO range of up to ±20 ppm plus 7.5 KHz, and may provide fast detection and 99% probability of detection under these conditions, while keeping the computational complexity low relatively to the full-length cross-correlation method.

Embodiments of the present invention will be given with reference to NB-IoT section of LTE rel. 13. However, it will be apparent to these skilled in the art that embodiments of the present invention are not limited in this regard. Embodiments of the present invention may apply to other communication standards, or other releases of the LTE standards.

Figure 1:
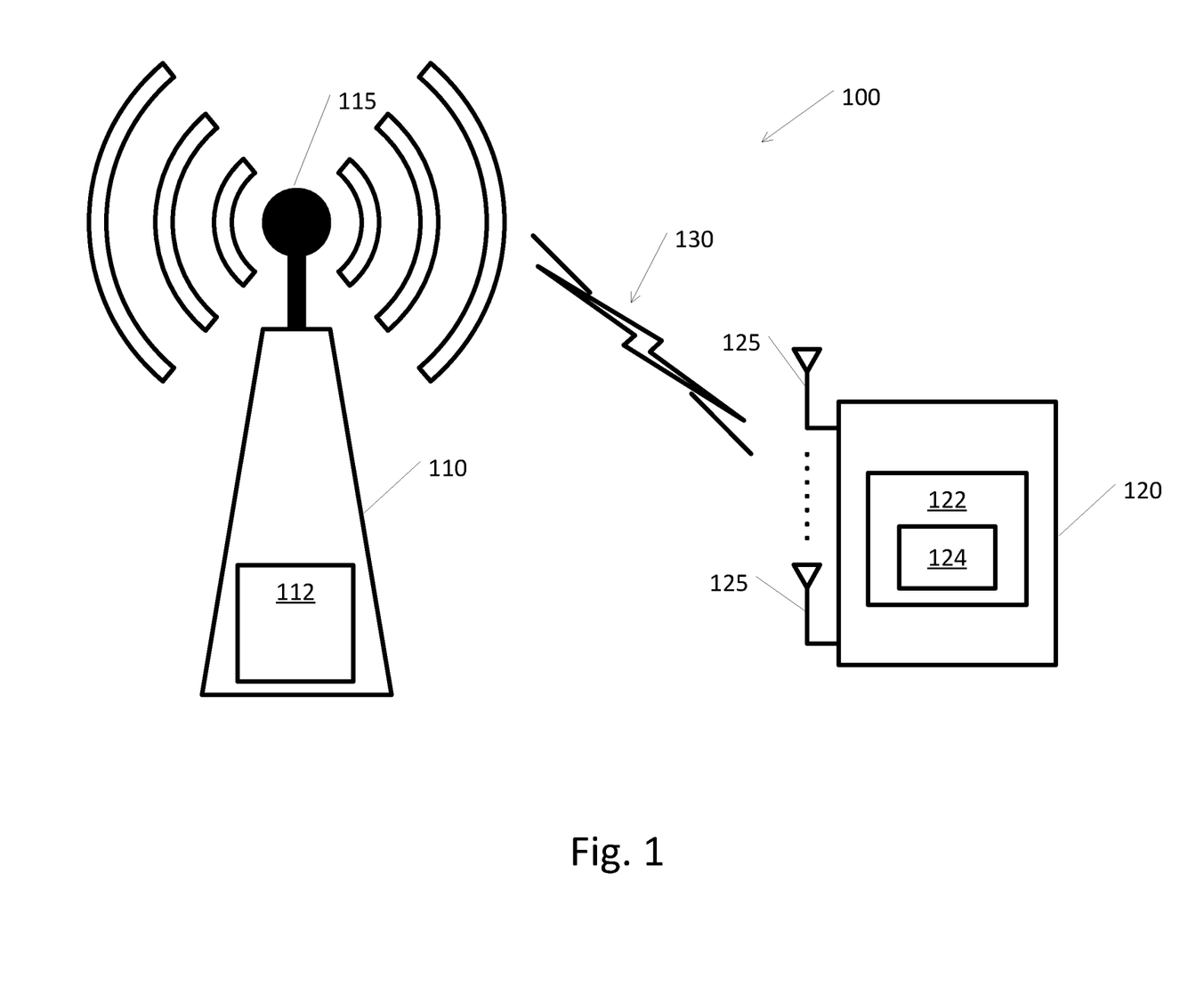
FIG. 1 is a schematic illustration of an exemplary cellular communication system, according to embodiments of the invention.

Reference is now made to FIG. 1 which is a schematic illustration of an exemplary cellular communications system 100, according to embodiments of the invention. Cellular communications system 100 includes a base station 110, e.g., an eNodeB or another device, of a radio communications cell, and UE 120. UE 120 may refer to any device used to communicate over a wireless (e.g., radio) communication network. UE 120 may be or may include, for example, computing devices having mobile broadband communication capabilities, e.g., a hand-held telephone or smartphone, a laptop computer equipped with a mobile broadband adapter, an IoT device or a Machine Type Communication (MTC) device, e.g., environment or industrial remote sensors, domestic sensors, wearables, etc. As is apparent to one of ordinary skill in the art, base station 110 and UE 120 are not drawn to scale and are illustrative only.

UE 120 may include a transceiver 122 and one or more antennae 125 for transmitting and receiving cellular communications signals, e.g., transmission 130 to base station 110. Base station 110 may include a transceiver 112 and a plurality of antennae 115 for transmitting and receiving cellular communications signals, e.g., transmission 130, to UE 120. UE 120 may be dormant for long time periods. Upon activation, UE 120 may need to synchronize with base station 110. Base station 110 may periodically transmit or broadcast synchronization signals for this purpose. According to some communication standards, e.g., LTE rel. 13, the synchronization signals may include primary and secondary synchronization signals, e.g., NPSS and NSSS, respectively. The NPSS and NSSS sequences may be known to UE 120. Thus, UE 120 may estimate the position of the NPSS and synchronize with the transmission of base station 110 based on the expected NPSS and received NPSS.

In many applications UE 120 may have a significant CFO from the frequency of base station 110, e.g., the difference between the frequency of base station 110 and the initial frequency of UE 120 may be large. The large CFO may be a result of using cheap, low quality, oscillator at UE 120, in order to reduce the cost of UE 120. In some embodiments, the CFO of UE 120 may be up to ±20 ppm plus 7.5 Khz. Thus, the initial cell synchronization may have to be performed under this range of CFO. However, embodiments of the present invention may support other ranges of CFO.

Figure 2:
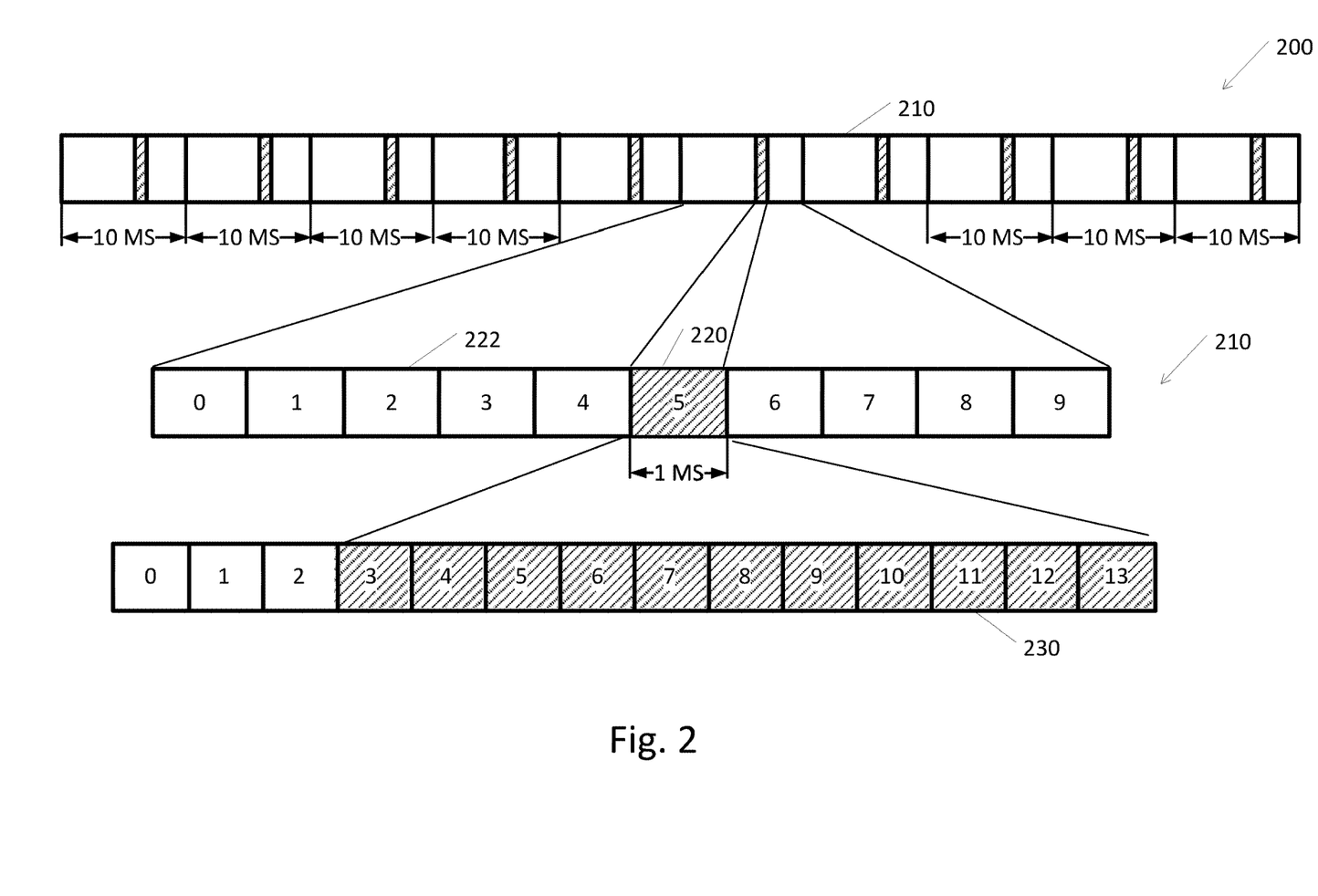
FIG. 2 depicts an exemplary NPSS subframe helpful in demonstrating embodiments of the present invention.

Reference is now made to FIG. 2, which depicts exemplary NPSS subframe 220, helpful in demonstrating embodiments of the present invention. In the example presented in FIG. 2, a wireless (e.g. radio) signal 200 includes radio frames or frames 210 each including a plurality of subframes 222. For example, frames 210 may be 10 milliseconds (msec) long and may include 10 subframes 222, each 1 msec long. NPSS subframe 220 may occur in subframe #5 of every frame 210. NPSS subframe 220 may include 11 repetitions of symbols 230, e.g., synchronization OFDM symbols 3-13. Symbols 230 may be identical or substantially identical to each other, e.g., they may have a different sign bit but otherwise have all other data be the same between them. Embodiments of the present invention may operate with NPSS as defined in LTE release 13, however, embodiments of the present invention are not limited in this regard and may operate with other synchronization signals that include repeating symbols.

Figure 3:
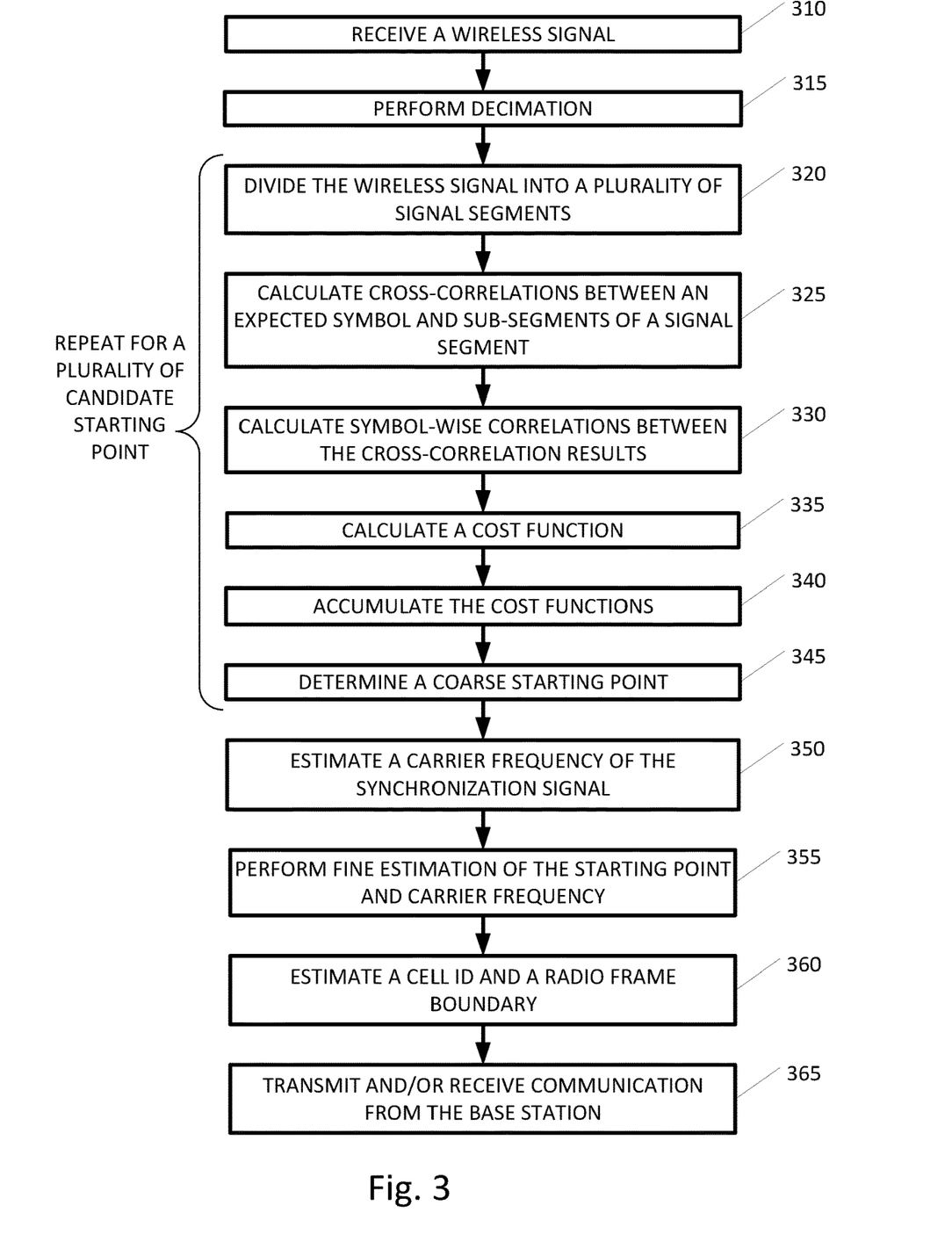
FIG. 3 is a flowchart diagram illustrating a method for two phase synchronization, according to embodiments of the invention.

Reference is now made to FIG. 3 which is a flowchart diagram illustrating a method for two phase cell synchronization, according to embodiments of the invention. In some embodiments a method for two phase cell synchronization, also referred to as two phase correlation synchronization method, may be performed by a processor (e.g., processor 710 depicted in FIG. 7) and initiated by a set of commands or instructions or by a chip, an integrated circuit (IC) or dedicated hardware logic (VLSI). According to some embodiments, a method for two phase cell synchronization may be performed by UE, for example, UE 120.

In operation 310 a wireless (e.g. radio) signal may be received. Base station 110 may transmit or broadcast the wireless signal that may be received by UE 120. The wireless signal may contain a synchronization signal including NPSS and NSSS that repeats in or across predetermined typically regular time intervals, e.g., every frame or every two frames, respectively. The NPSS may be known to UE 120, and the NSSS may be known to the UE given the eNodeB cell ID and the radio frame index of the transmitted signal in an 80 msec time boundary. For example, symbols 3-13 presented in FIG. 2 may be known to UE 120. However, the timing of the signal may not be known as well as the exact frequency. An example of NPSS is presented in FIG. 2. According to some embodiments, the signal may be sampled using high sampling rate, e.g., 1.92 MHz, or other.

In operation 315 decimation or downsampling of the received signal may be performed to achieve a low rate version of the received signal. In some embodiments the received signal may be filtered by a low pass filter prior to decimation. In some embodiments at least a part of the synchronization process may be performed at a lower sampling rate, e.g., at 240 KHz, or other lower sampling rates. Embodiments of the present invention are not limited to a specific sampling rate and other sampling rates may be used if required. In some embodiments, a coarse estimation of the carrier frequency and the synchronization point of the wireless signal may be performed at the lower sampling rate, to reduce the complexity of the calculations. Coarse estimating of the carrier frequency and the synchronization point of the wireless signal may be the most computationally intensive part of the synchronization process. Therefore, performing this part of the algorithm in relatively low sampling rate may provide sufficient accuracy while reducing the computational power required for this process.

According to same embodiments, decimation may be performed by selecting samples at constant intervals, e.g., using a decimation step (e.g., a value by which the sampling time is multiplied or the sampling rate is divided). For example a decimation step of 8 may be used.

As known, each NB-IoT OFDM symbol may be preceded by a cyclic prefix (CP). For 1.92 MHz sampling rate there may be two CP lengths: CP of 10 samples and CP of 9 samples. Typically, the 10 length CP precedes the first and eighth OFDM symbols (e.g., symbols 0 and 7) out of the fourteen OFDM symbols of a subframe. The length of an OFDM symbol without a CP is divisible by the decimation step. However, the total length of the OFDM symbol when a CP of either length is included in the OFDM symbol is not divisible by the decimation step. Due to the different length of the CP, using a constant decimation step may not sample symbols equally. When regular decimation is performed, the decimated signal may suffer from time drift due to the constant decimation step.

According to same embodiments, smart decimation may be performed. Smart decimation may consider the different lengths of the OFDM symbols, and the signal may be decimated with respect to the two possible lengths of the OFDM symbols. In order to perform smart decimation in the coarse stage, due to lack of initial knowledge concerning the start of any subframe, it may be assumed that the first subframe begins at the start of the received signal. According to embodiments of the present invention, decimation of the wireless signal prior to dividing the wireless signal to the plurality of signal segments may be performed using varying decimation steps. OFDM symbols in a subframe may be sampled so that their CP may be sampled by a decimation step equal to the length of their CP, e.g., a decimation step of 9 or 10 based on the location of the OFDM symbol. The rest of the OFDM symbol may be sampled based on the original decimation step, e.g., a decimation step of 8. Smart decimation may allow sampling equal amount of samples across different OFDM symbols despite them having different length in high rate. Smart sampling simplifies some of the synchronization process disclosed herein, specifically the symbol-length cross-correlations of operation 325, since it allows simple implementation for recursive computation of the symbol-length cross-correlation.

In operation 320 the received signal (e.g., at a low or high rate) may be divided into a plurality of signal segments. The length or duration of the signal segments may be equal or longer than the length or duration of a radio frame. Thus, signal segments may be longer or have a longer duration than the predetermined (typically regular) time interval in which NPSS repeats. For example, the received signal may be windowed or multiplied by a window function. The length of the signal segments, or the width of the window, may be determined to be longer than the time interval in which the NPSS repeats to ensure that a signal segment may include a complete occurrence of NPSS. For example, the signal segments may be longer than a frame 210 of the wireless signal 200, e.g., longer than 10 msec.

Operations 320-340 may be repeated for a plurality of coarse candidate synchronization points. A coarse candidate synchronization point may refer to a point or time in the received signal that is a candidate for being the known or starting timing point of the radio frame. Each coarse candidate synchronization point may be a guess of the time location of the synchronization signal. At the beginning of the synchronization process the location of the synchronization signal is not known and may be located practically anywhere in the received signal. Thus, the coarse synchronization process of operations 320-340 may be repeated for a plurality of coarse candidate synchronization points. In some embodiments each sample of the low rate signal may be a coarse candidate synchronization point. Operations 320-340 may be repeated for a plurality of coarse candidate synchronization points until at operation 345 a coarse location of the synchronization signal may be determined or selected, as disclosed herein.

In operation 325 symbol-length cross-correlations between an expected or known symbol and sub-segments of a signal segment of the synchronization signal may be calculated or computed to produce symbol-length cross-correlation results. In some embodiments the sub-segments may have a time duration equal to a duration of a symbol. As noted before, the NPSS may be known to UE 120. The symbol-length cross-correlations may be performed for example according to (other equations may be used):

$$y_h(\tau,k) = \sum_{n=0}^{N_{OFDM}-1} x[\tau+n+kN_{OFDM}] \text{NPSS}_{Symbol}^*[n] e^{j2\pi f_h(\tau+n+N_{OFDM})}$$ (Equation 2)

Where x is a sample value, $\tau$ is a time delay representing or related to the candidate synchronization point, n is an integer counter, k is the symbol number, e.g., k=0, 1 ... 10, $N_{OFDM}$ is the length of the decimated NPSS symbol, $\text{NPSS}_{symbol}^*[n]$ is the conjugate sample value of the known expected NPSS symbol and $f_h$ is a CFO hypothesis. It is noted that the length of the symbol-length cross-correlation of operation 325 equals or substantially equals a length of an NPSS symbol, in contrary to the cross correlation method in which the length of the full-length cross-correlation substantially equals a length of a full NPSS sequence. According to the LTE rel. 13 standard the NPSS consists of 11 NPSS symbols. Thus, for each of a plurality of time delay values $\tau$, eleven symbol-length cross-correlations, $\{y_h(\tau, k)\}_{k=0}^{10}$, may be computed. In some embodiments, operations 325-340 may be repeated or iterated for a plurality of CFO hypotheses, $f_h$, in order to reduce attenuation caused by the difference between the CFO hypotheses and the true CFO. Due to the short length of the cross correlations, about 4-5 frequency hypotheses may be required in order to obtain acceptable accuracy or detection rate, e.g., about 99% detection probability. This is about ten times smaller than the 44 frequency hypotheses that need to be tested when the prior art full-length cross-correlation method is used. Hence, the computational complexity is dramatically reduced. According to embodiments of the present invention, the number of tested CFO hypotheses may be determined so that the maximal range of the CFO divided by the number of hypotheses will be approximately or around 10 KHz (e.g., 10 KHz±10%) or less. According to some embodiments, the symbol-length cross-correlation may be recursively computed or calculated by reusing computation of previous OFDM symbols, due to the repetitive structure of the NPSS symbols. For example, in case of eleven symbols in an NPSS subframe, let $\{y_h(\tau, k)\}_{k=0}^{10}$ be the symbol-length cross-correlation computed for time delay $\tau$ and frequency hypothesis h. When computing the symbol-length cross-correlation of $\tau'=\tau+N_{OFDM}$, it is clear that the first 10 symbol-length cross-correlations were already computed, e.g. (other equations may be used):

$$\{y_h(\tau',k)\}_{k=0}^{9}=\{y_h(\tau,k)\}_{k=1}^{10} \quad \text{(Equation 3)}$$

In one embodiment the only symbol-length cross-correlation that should be computed is $y_h(\tau', 10)$. Reusing calculations as disclosed herein may reduce the computation complexity of operation 325 by a factor of up to 11, in exchange for the expense of minor increase in memory allocations.

As described, when regular decimation is performed, the decimated signal may suffer from time drift as a result of using a constant decimation step for decimating samples having different length (due to different length of the CP). According to some embodiments, the time drift effect may be neutralized by puncturing or skipping a sample of the received signal at known intervals. Using recursive computation of the symbol-length cross-correlation with a punctured signal may require additional memory allocation and managing and storing additional parameters. However, smart decimation may allow simple implementation of the recursive computation of the symbol-length cross-correlation, since the time drift effect may be substantially eliminated; and so no puncturing or skipping of samples may be required. Thus, the implementation of the symbol-length cross-correlation using smart decimation as disclosed herein may require reduced memory allocation compared with regular decimation.

According to embodiments of the present invention, calculating the symbol-length cross-correlation as disclosed herein may reduce the power of the noise dramatically, since the noise is uncorrelated in time. Thus, the power of the noise present in the symbol-length cross-correlations results $y_h$, may be lower by a factor substantially equal to the length of the decimated OFDM symbol, $N_{OFDM}$, relatively to the power of the noise in wireless signal 200. The power of the signal in the symbol-length cross-correlation output may be attenuated with relation to the difference between the true CFO and the CFO hypothesis. Thus, the SNR of the output may increase for some of the CFO hypothesis, and may have the highest SNR output in the CFO hypothesis with the lowest distance to the true CFO. The output SNR in the CFO hypothesis with the lowest distance to the true CFO may be significantly higher than the SNR of wireless signal 200.

In operation 330 segmented symbol-wise correlations between the symbol-length cross-correlation results may be calculated or computed to produce symbol-wise correlations results. Segmented symbol-wise correlations $S_h(\tau, m)$ may be performed for example according to (other equations may be used):

$$S_h(\tau,m)=\Sigma_{k=0}^{10-m} y_h^*(\tau,k)s(k)y_h(\tau,k+m)s(k+m) \quad \text{(Equation 4)}$$

Where $s(k)$ is a sign of the cover code of the $k^{th}$ OFDM symbol in the NPSS. m is the correlation lag, e.g., the gap between correlated symbols. For example, for m=1 pairs of adjacent symbols are correlated, for m=2 pairs of symbols separated by one symbol are correlated, etc. Operation 330 may be computed recursively in a similar manner to the symbol-length cross-correlation, e.g.: the products $\{y_h^*(\tau, k)y_h(\tau, k+m)\}_{k=1}^{10-m-1}$, may be saved in the system and computed recursively and the product $s(k)s(k+m)$ may equal to either 1 or −1, and may be computed offline in advance, since the cover code is known. Recursive calculation of the segmented symbol-wise correlations may reduce the computational complexity of the system in an expanse of minor increase in memory allocations.

In operation 335 a cost function may be calculated based on the results of the segmented symbol-wise correlations. According to some embodiments the cost function may be a weighted cost function. For example, the cost function may be calculated for example according to (other equations may be used):

$$\rho_h(\tau)=w_1 S_h(\tau,1)+w_2 S_h(\tau,2)S_h^*(\tau,1)+w_3 S_h(\tau,3)S_h^*(\tau,2) \quad \text{(Equation 5)}$$

Where $\rho_h(\tau)$ is a cost function for time delay $\tau$ and CFO hypothesis h, and $w_1$, $w_2$ and $w_3$ are weights of the symbol-wise correlations. Embodiments of the present invention are not limited to a specific cost function and other cost functions may be used. Weights $w_1$, $w_2$ and $w_3$ may be determined according to any applicable method, e.g., based on the number of correlation results that were summed in order to calculate $S_h(n,m)$ or empirically.

In operation 340 the cost functions may be accumulated (e.g., summed) across a plurality of signal frames, e.g., consecutive signal frames. The accumulated cost functions may be stored in memory (e.g., memory 720). At the correct or synchronized location of the NPSS the cost function may be accumulated coherently across radio frames, e.g., across segments starting every 10 msec. The cost function may have a complex value. The accumulation of the cost functions across frames may be coherent since at the correct location of the NPSS the phase of the cost function may be constant between radio frames. In addition, since the noise may be non-coherent, the power of the noise may decrease at every accumulation. This may improve the performance of embodiments of the method significantly. For example, the cost function may be calculated according to:

$$\rho_{\Sigma,h}(\tau)=Q\rho_{\Sigma,h}(\tau)+(1-Q)\rho_h(\tau) \quad \text{(Equation 6)}$$

Where $\rho_{\Sigma,h}(\tau)$ is the accumulated cost function for time delay $\tau$, and CFO hypothesis h (at the right side of Equation 6 $\rho_{\Sigma,h}(\tau)$ is the accumulated cost function of the previous radio frames and at the left side of Equation 6 $\rho_{\Sigma,h}(\tau)$ is the accumulated cost function of the current radio frame). Q is a decay factor of the coherent accumulation, which may dynamically updated based on the number of accumulations.

At operation 345 a coarse location of the synchronization signal may be determined or selected based on the accumulated cost functions or the result of the accumulation. In some embodiments, accumulating the cost functions may continue until a predetermined condition is met, for example until a predetermined threshold is crossed. In some embodiments a minimal time for accumulating the cost function may be determined. Determining the minimal time may include estimating the SNR of the wireless signal and determining a minimal time based on the SNR. The SNR estimation need not be very accurate to insure good system performances. The threshold may be determined based on a peak of the power of the cost function and the difference between the value of the peak and the average power of the cost function surrounding the peak. For example, given that the highest peak of the power of the cost function in hypothesis $h_0$ is located at time offset $\tau_0$, the threshold, thr, may be computed by (other functions may be used):

$$thr = \frac{\|\rho_{\Sigma,h_0}(\tau_0)\|^2}{\|\rho_{\Sigma,h_0}(\tau_0)\|^2 - \frac{1}{2N+1}\sum_{n=-N}^{N}|\rho_{\Sigma,h_0}(\tau_0-n)|^2}$$

Where n may be a predetermined factor, determined based on field tests or on simulation results. In some embodiments, the accumulation time may have maximal time constraint as well.

Determining or selecting the coarse synchronization point of the wireless signal may include finding the hypothesis cost function with the highest peak in its absolute value compared with other hypothesis cost functions and selecting a candidate synchronization point based on the location of the highest peak. For example, the coarse synchronization point may be at the location of the highest peak.

In operation 350 the coarse CFO or carrier frequency of the wireless signal may be estimated based on the frequency hypothesis with the highest peak of the accumulated cost function and on the phase of the peak value of the accumulated cost function. For example the coarse carrier frequency, $f_{CFO}$, calculation may be based on the following equation (other functions may be used):

$$f_{CFO} = f_{h_0} + \frac{\text{angle}(\rho_{\Sigma,h_0}(\tau_0))}{\pi} f_{max}$$

Where $h_0$ is the hypothesis with the highest peak, $\tau_0$ is the location of the highest peak, $f_{h_o}$ is the frequency of the hypothesis with the highest peak, and $f_{max}$ is the maximum frequency. $f_{max}$ may be a predetermined value. For example, $f_{max}$ may be calculated from the phase changed in a single OFDM symbol. In some embodiments $f_{max}$ may be about 7 KHz.

In operation 355 a fine estimation of the fine synchronization point and fine carrier frequency may be performed. Typically, fine estimation is performed at a high sampling rate of the received signal (the original sampling rate before decimation, e.g., 1.92 Mhz). Fine estimation of the fine synchronization point may be performed using the estimated coarse synchronization point and coarse carrier frequency, as known in the art. For example, fine estimation of the fine synchronization point and fine carrier frequency may be performed by selecting a plurality of fine candidate synchronization points that are located in vicinity of the selected coarse synchronization point, and calculating, for each of the fine candidate synchronization points, cross-correlations between an expected sequence and segments of the received signal at high rate. For example, the fine candidate synchronization points may be located around the selected coarse synchronization point at a distance of up to 3 samples in the decimated sampling rate (e.g., 240 KHz). The correlation values may be accumulated across a plurality of signal segments until a predetermined condition is met. A highest peak in the accumulated cross-correlation may be found, and a fine synchronization point of the received signal may be determined based on the highest peak.

In operation 355, the coarse time and CFO estimation determined in operations 345 and 350 may be refined. In some embodiments, the cross-correlation in operation 355 may not require CFO hypotheses. However, better accuracy may be achieved if a few fine CFO hypotheses are evaluated in operation 355 to refine the coarse CFO estimation. The fine CFO estimation may be computed using fast Fourier transform (FFT). For example, by performing FFT on the multiplication between the received signal at its fine synchronization point hypothesis and the conjugated NPSS signal. As known, the CFO can be computed from the FFT output. Other methods may be used for refining the coarse time and CFO estimations, as known in the art.

In operation 360, UE 120 may perform estimation of a cell ID of base station 110 and of a radio frame boundary. The cell ID and radio frame boundary may be estimated based on the structure of the NSSS. Estimation of the cell ID and the radio frame boundary may be performed using any applicable method. For example, the estimation procedure may include cross-correlating the received signal with a plurality of NSSS hypotheses each having different cell ID and radio frame index modulo 8 (e.g., each having a different remainder after division of the radio frame index by 8). The cross-correlations of operation 360 may be performed either in the time domain or in the frequency domain. UE 120 may utilize the time and frequency estimations from e.g., the fine estimation stage, to improve the performance of the cell ID and the radio frame boundary estimation. The correlation may be performed after CP is removed and using the low rate version of the received signal.

In operation 365, UE 120 may be synchronized with base station 110 and communication between UE 120 and base station 110 may be established using, e.g., the estimated fine carrier frequency and fine synchronization point. Thus, UE 120 may transmit and/or receive communication from base station 110 using the fine or coarse estimated carrier frequency and synchronization point. The synchronization point allows the UE to separate the receive signal to OFDM symbols, remove their CP and perform decimation. The estimated carrier frequency is used to cancel the effect of the CFO and allows demodulation of the NB-IoT signal from the received signal.

Figure 4:
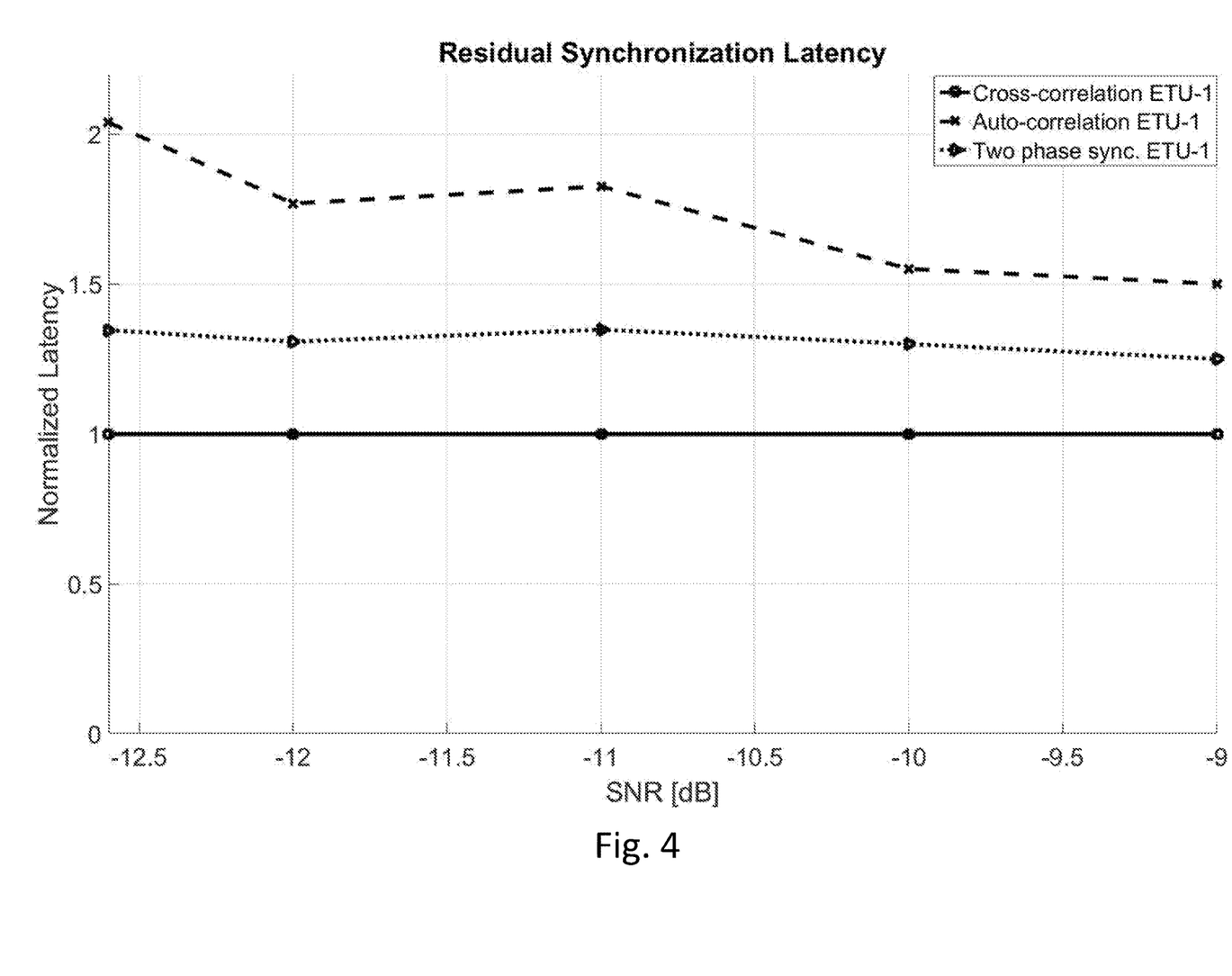
FIG. 4 presents simulation results comparing the latency performance with 99% detection of coarse estimation using full-length cross-correlation, autocorrelation and two phase synchronization normalized by the latency of the full-length cross-correlation method according to embodiments of the present invention, in extended typical urban channel with 1 Hz maximum Doppler shift (ETU-1)
Figure 5:
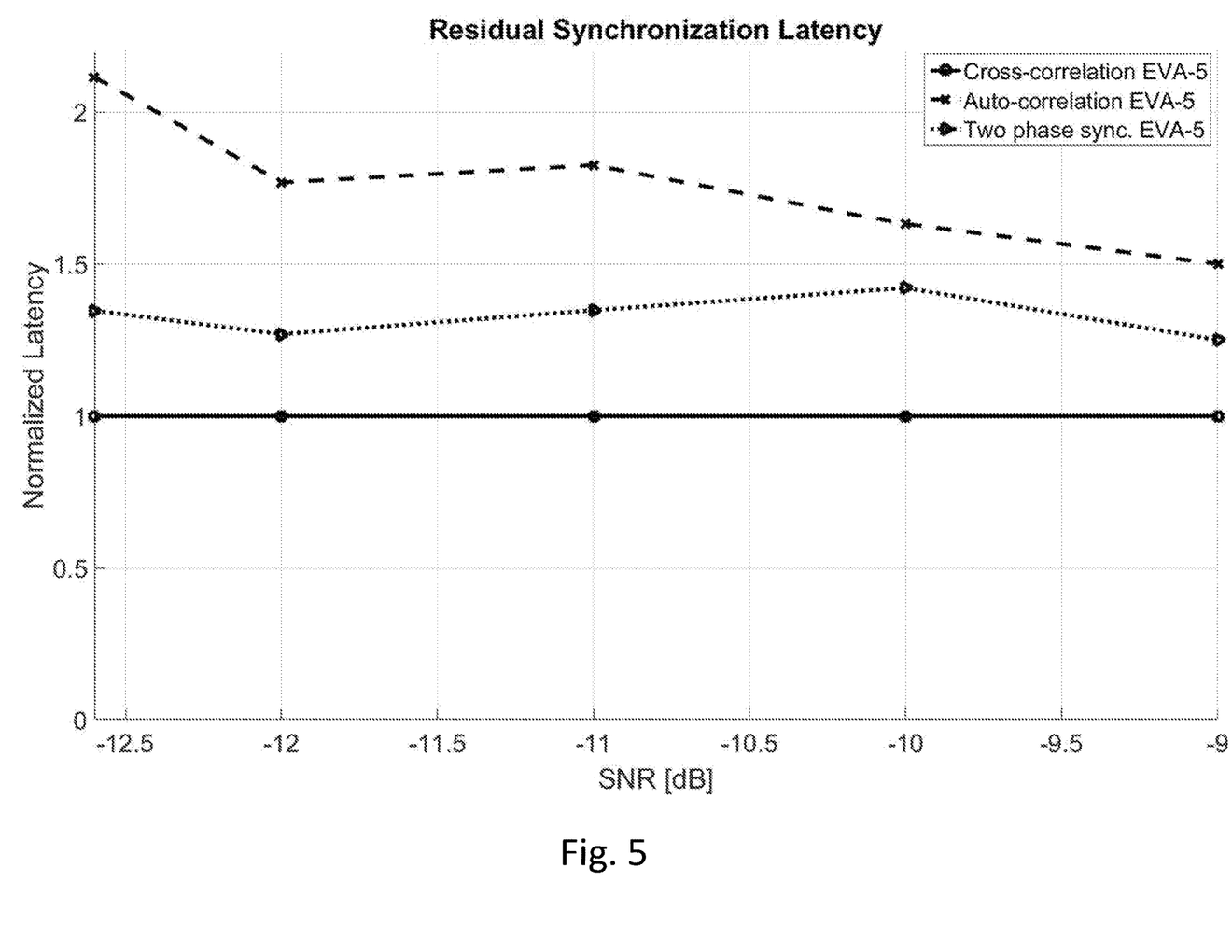
FIG. 5 presents simulation results comparing the latency performance with 99% detection of coarse estimation using full-length cross-correlation, autocorrelation and two phase synchronization normalized by the latency of the full-length cross-correlation method according to embodiments of the present invention, in extended vehicular A channel with 5 Hz maximum Doppler shift (EVA-5)
Figure 6:
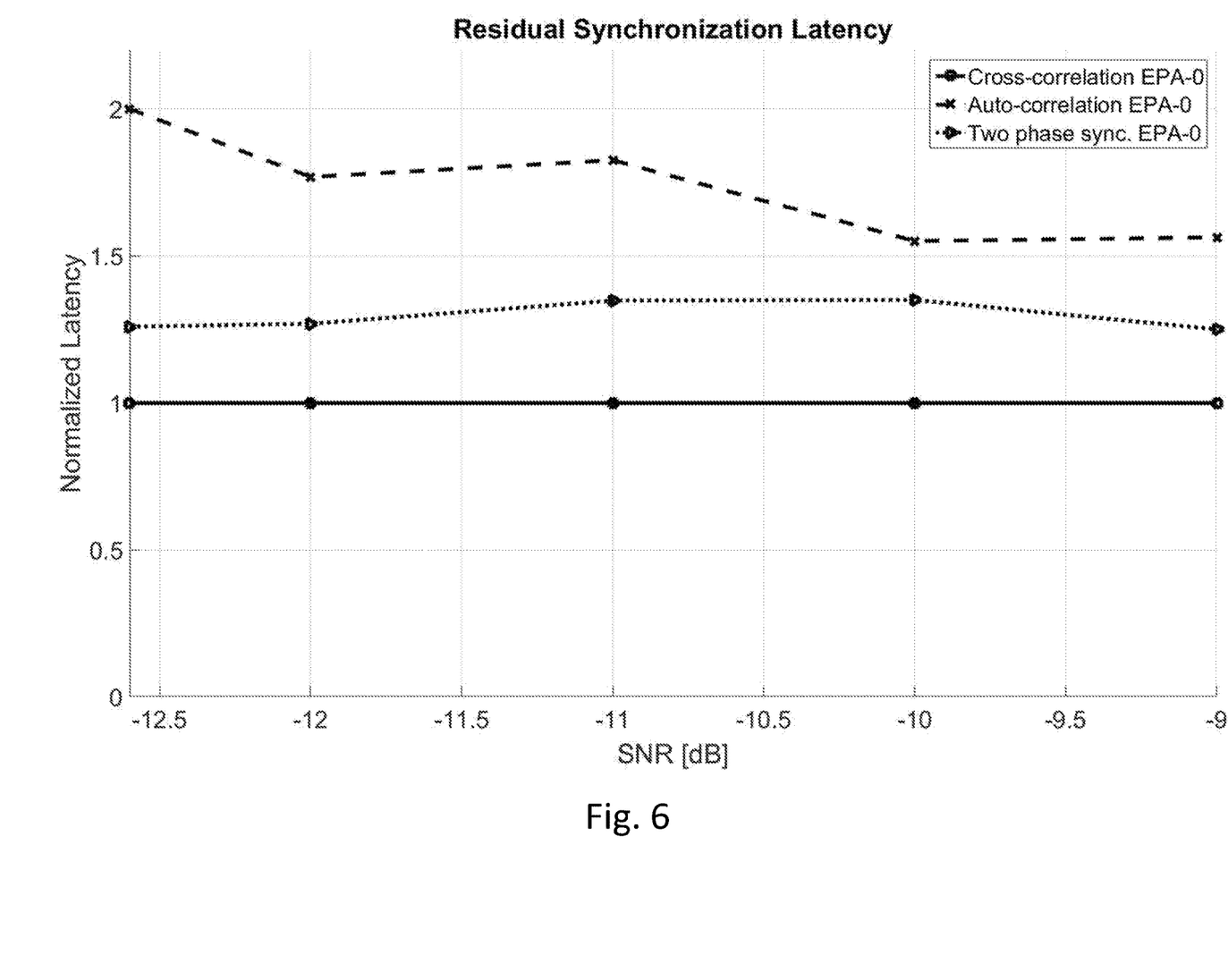
FIG. 6 presents simulation results comparing the latency performance with 99% detection of coarse estimation using full-length cross-correlation, autocorrelation and two phase synchronization normalized by the latency of the full-length cross-correlation method according to embodiments of the present invention, in extended pedestrian A channel without Doppler shift (EPA-0) channel.

FIGS. 4-6 present simulation results comparing performance of coarse estimation using full-length cross-correlation, autocorrelation and two phase (e.g. "2D") cell synchronization according to embodiments of the invention, in ETU-1, EVA-5 and EPA-0 channels, respectively. The graphs present simulation results comparing the latency performance, with 99% detection, of coarse estimation using autocorrelation and two phase synchronization, normalized by the latency of coarse estimation using full-length cross-correlation. As can be seen, two phase cell synchronization may provide good balance between latency and computational complexity while keeping good detection performances.

Two phase cell synchronization may allow coherent combining of the cost function with high output SNR, usage of relatively low number of hypotheses compared to full-length cross-correlation and estimating CFO. Table 1 provides a summary of the differences between the three methods for cell synchronization.

TABLE 1

A summary of the differences between the three example methods for cell synchronization:

|  | Two phase cell synchronization | Auto-correlation | Full-length cross-correlation |
| --- | --- | --- | --- |
| Operation | Symbol-length cross-correlations and symbol-wise correlations | Symbol-wise auto-correlation | Full-length cross-correlation |
| Combining of cost function | Coherent combining | Coherent combining | Incoherent combining |
| Output | Coarse time and CFO | Coarse time and fractional CFO | Coarse time and CFO |
| Latency | Low | High | Low |
| Complexity | Low | Low | Very High |
| SNR sensitivity | Low | High | Low |

Figure 7:
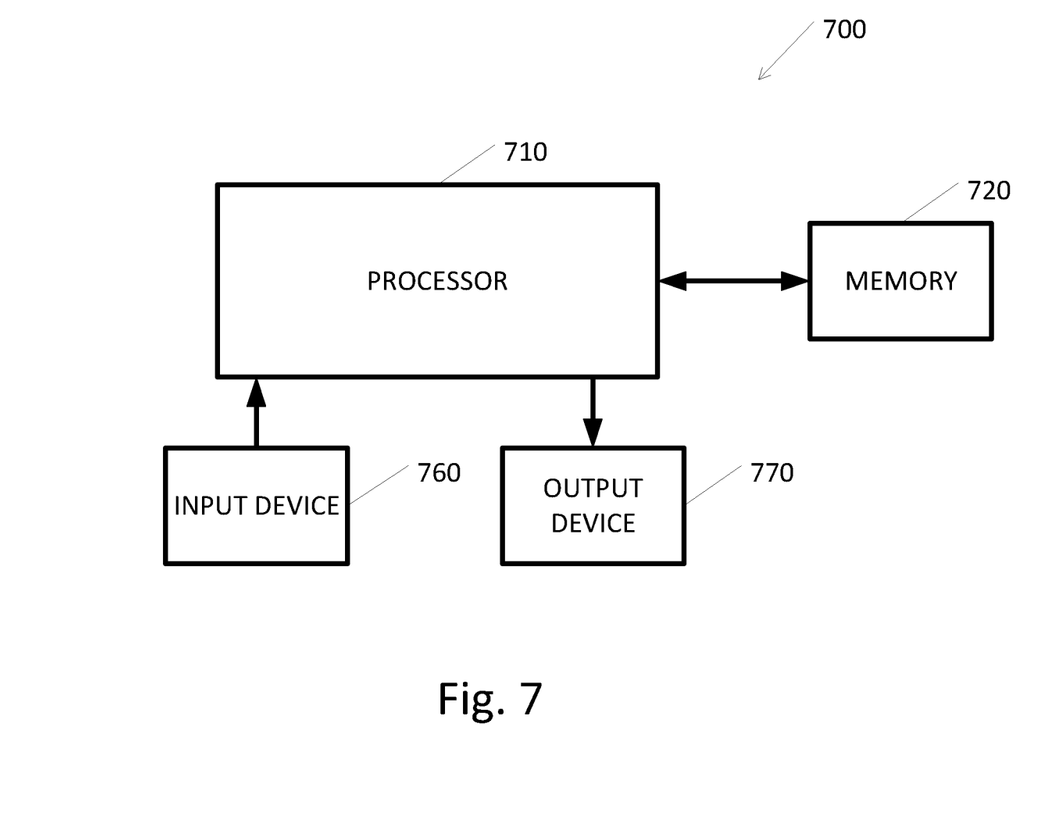
FIG. 7 is schematic illustration of an exemplary device according to embodiments of the invention.

Reference is made to FIG. 7, which is a schematic illustration of an exemplary device according to embodiments of the invention. A device 700 may include a computer device having a wireless communication capabilities, including for example, a UE, e.g., UE 120. Device 700 may include any device capable of executing a series of instructions, for example for performing the methods disclosed herein. Device 700 may include an input device 760 such as a mouse, a receiver, a keyboard, a microphone, a camera, a Universal Serial Bus (USB) port, a compact-disk (CD) reader, any type of Bluetooth input device, etc., and an output device 770, for example, a transceiver or a monitor, projector, screen, printer, speakers, or display.

Device 700 may include a processor 710. Processor 710 may include or may be a vector processor, a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 700 may include a memory unit 720. Memory unit 720 may be or may include any of a short-term memory unit and/or a long-term memory unit. Memory unit 720 may include, for example, random access memory (RAM), dynamic RAM (DRAM), flash memory, volatile memory, non-volatile memory, a tightly-coupled memory (TCM), a buffer, a cache, such as an L-1 cache and/or an L-2 cache, or other suitable memory units or storage units. Memory unit 720 may be implemented as separate (for example, "off-chip") or integrated (for example, "on-chip") memory unit, or as both.

Processor 710 may request, retrieve, and process data from memory unit 720 and may control, in general, the pipeline flow of operations or instructions executed on the data. Processor 710 may receive instructions, for example, from a program memory (for example, in memory unit 720 to perform methods disclosed herein. According to embodiments of the present invention, processor 710 may receive instructions to perform two phase cell synchronization as described herein.

Embodiments of the invention may be implemented for example on an integrated circuit (IC), for example, by constructing processor 710, as well as other components of FIG. 7 in an integrated chip or as a part of an chip, such as an ASIC, an FPGA, a CPU, a DSP, a microprocessor, a controller, a chip, a microchip, etc.

According to embodiments of the present invention, some units e.g., processor 710, as well as the other components of FIG. 7, may be implemented in a hardware description language (HDL) design, written in Very High Speed Integrated Circuit (VHSIC) hardware description language (VHDL), Verilog HDL, or any other hardware description language. The HDL design may be synthesized using any synthesis engine such as SYNOPSYS® Design Compiler 2000.05 (DCOO), BUILDGATES® synthesis tool available from, inter alia, Cadence Design Systems, Inc. An ASIC or other integrated circuit may be fabricated using the HDL design. The HDL design may be synthesized into a logic level representation, and then reduced to a physical device using compilation, layout and fabrication techniques, as known in the art.

Embodiments of the present invention may include a computer program application stored in non-volatile memory, non-transitory storage medium, or computer-readable storage medium (e.g., hard drive, flash memory, CD ROM, magnetic media, etc.), storing instructions that when executed by a processor (e.g., processor 710) carry out embodiments of the invention. Processor 710 may be configured to carry out embodiments described herein by for example executing software or instructions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computer implemented method for radio cell synchronization, the method comprising:

receiving, from a base station, by a processor of a user equipment (UE), a wireless signal, the wireless signal comprising a plurality of synchronization signals identical to each other that repeat in predetermined time intervals, the synchronization signals comprising a plurality of substantially identical synchronization symbols;

for a plurality of coarse candidate synchronization points:
dividing, by the processor, the wireless signal into a plurality of signal segments, each equal or longer than the time interval in duration, and each including a plurality of sub-segments having same time duration as a symbol of the plurality of synchronization symbols;

calculating, by the processor, symbol-length cross-correlations between an expected symbol and the sub-segments;

calculating, by the processor, segmented symbol-wise correlations between the symbol-length cross-correlation results;

calculating, by the processor, a cost function based on the results of the symbol-wise correlations;

accumulating, by the processor, the cost functions across a plurality of signal segments; and selecting, by the processor, a coarse synchronization point from the plurality of candidate synchronization points based on the accumulated cost functions.

2. The method of claim 1, wherein accumulating the cost functions continues until a predetermined condition is met, and wherein determining the coarse synchronization point of the wireless signal comprises finding the accumulated cost function with a highest peak in its absolute value and selecting the coarse synchronization point based on a location of the highest peak.

3. The method of claim 1, wherein calculating the symbol-length cross-correlations, calculating the auto-correlations, calculating the cost function and accumulating the cost functions are repeated for a plurality of frequency hypotheses.

4. The method of claim 3, comprising estimating, by the processor, a coarse carrier frequency of the wireless signal based on a frequency hypothesis with the highest peak in its absolute value and on the phase of a value of the highest peak of the accumulated cost function.

5. The method of claim 4, comprising:
performing estimation of a fine synchronization point and a fine carrier frequency using the coarse synchronization point and the coarse carrier frequency; and
establishing communication between the UE and the base station using, the estimated fine carrier frequency and fine synchronization point.

6. The method of claim 1, wherein the symbol-length cross-correlations are calculated recursively.

7. The method of claim 1, wherein the segmented symbol-wise correlations are calculated recursively, and wherein a product of a cover code is calculated in advance based on knowledge of the cover code.

8. The method of claim 1, comprising performing, by the processor, decimation of the wireless signal prior to dividing the wireless signal to the plurality of signal segments using a varying decimation step.

9. The method of claim 1, comprising performing, by the processor, decimation of the wireless signal prior to dividing the wireless signal to the plurality of signal segments.

10. The method of claim 1, wherein the accumulation of the cost function is weighted using a decay factor.

11. The method of claim 10, wherein the decay factor is determined based on the number of past accumulation or based on estimated time drift of the wireless signal.

12. The method of claim 1, wherein the synchronization signal is a narrow-band primary synchronization signal (NPSS), and wherein the symbols are NPSS symbols with an orthogonal frequency-division multiplexing (OFDM) symbol length.

13. A computer implemented method for radio cell synchronization, the method comprising:
performing, by a processor, symbol-length cross-correlations between an expected narrow-band primary wireless signal (NPSS) symbol and sub-segments of a signal segment, the sub-segments having a time duration of the expected NPSS symbol;
performing, by the processor, symbol-wise correlations between the symbol-length cross-correlation results;
calculating, by the processor, a cost function based on the results of the symbol-wise correlations;
accumulating, by the processor, the cost functions across a plurality of signal segments; and
determining, by the processor, a coarse synchronization point and a carrier frequency of the synchronization signal based on the accumulated cost functions.

14. A device for performing radio cell synchronization, the device comprising:
a memory;
a processor configured to:
receive a wireless signal, the wireless signal comprising a plurality of synchronization signals substantially identical to each other that repeat in predetermined time intervals, the synchronization signals comprising a plurality of substantially identical synchronization symbols;
for a plurality of candidate synchronization points:
divide the wireless signal into a plurality of signal segments, each equal or longer than the time interval in duration, and each including a plurality of sub-segments having substantially same length as time duration as a symbol of the plurality of synchronization symbols;
perform symbol-length cross-correlations between an expected symbol and the sub-segments;
perform segmented symbol-wise correlations between the symbol-length cross-correlation results;
calculate a cost function based on the results of the symbol-wise correlations;
accumulate the cost functions across a plurality of signal segments; and
select a coarse synchronization point from the plurality of candidate synchronization points based on the accumulated cost function.

15. The device of claim 14, wherein the processor is configured to continue accumulating the cost functions until a predetermined condition is met, and wherein the processor is configured to determine the coarse synchronization point of the wireless signal by finding the accumulated cost function with a highest peak in its absolute value and selecting the coarse synchronization point based on a location of the highest peak.

16. The device of claim 14, wherein the processor is configured to repeat performing symbol-length cross-correlations, performing auto-correlations, calculating the cost function and accumulating the cost functions for a plurality of frequency hypotheses.

17. The device of claim 16, wherein the processor is configured to estimate a coarse frequency of the wireless signal based on a frequency hypothesis with the highest peak in its absolute value and on the phase of a value of the highest peak of the accumulated cost function.

18. The device of claim 14, wherein the processor is configured to perform decimation of the wireless signal prior to dividing the wireless signal to the plurality of signal segments, using a varying decimation step.

19. The device of claim 14, wherein the processor is configured to perform decimation of the wireless signal prior to dividing the wireless signal to the plurality of signal segments.

20. The device of claim 14, wherein the synchronization signal is a narrow-band primary synchronization signal (NPSS), and wherein the symbols are NPSS symbols with an orthogonal frequency-division multiplexing (OFDM) symbol length.

* * * * *